US012741246B2

(12) United States Patent
Kobayashi et al.

(10) Patent No.: US 12,741,246 B2
(45) Date of Patent: Sep. 22, 2026

(54) MIXED GAS SEPARATION METHOD AND MIXED GAS SEPARATION APPARATUS

(71) Applicant: NGK INSULATORS, LTD., Nagoya-City (JP)

(72) Inventors: Ko Kobayashi, Nagoya-City (JP); Katsuya Shimizu, Kasugai-City (JP); Aya Miura, Kariya-City (JP); Kenichi Noda, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 307 days.

(21) Appl. No.: 18/524,431

(22) Filed: Nov. 30, 2023

(65) Prior Publication Data

US 2024/0100474 A1 Mar. 28, 2024

Related U.S. Application Data

(63) Continuation of application No. PCT/JP2022/020070, filed on May 12, 2022.

(30) Foreign Application Priority Data

Jun. 3, 2021 (JP) ................................ 2021-093576

(51) Int. Cl.
*B01D 53/22* (2006.01)
*B01D 69/04* (2006.01)
*B01D 71/02* (2006.01)

(52) U.S. Cl.
CPC ......... *B01D 53/228* (2013.01); *B01D 69/043* (2013.01); *B01D 71/0281* (2022.08);
(Continued)

(58) Field of Classification Search
CPC .................. B01D 53/228; B01D 71/00; B01D 71/0281; B01D 69/043; B01D 2256/10;
(Continued)

(56) References Cited

U.S. PATENT DOCUMENTS 5,649,996 A 7/1997 Soffer et al.
2002/0116946 A1 8/2002 Choi et al.
(Continued)

FOREIGN PATENT DOCUMENTS

CN 1492983 A 4/2004
CN 102348494 A 2/2012
(Continued)

OTHER PUBLICATIONS

English translation of the International Preliminary Report on Patentability (Chapter I) dated Dec. 14, 2023 (Application No. PCT/JP2022/020070).

(Continued)

*Primary Examiner* — Qianping He
(74) *Attorney, Agent, or Firm* — Muncy, Geissler, Olds & Lowe, P.C.

(57) ABSTRACT

A mixed gas separation method includes a step of supplying a mixed gas to the separation membrane and causing a gas with high permeability in the mixed gas to permeate through the separation membrane. In the step, when ΔP is a difference between a gas pressure on the primary side of the separation membrane, i.e., a feed pressure, and a gas pressure on the secondary side of the separation membrane, i.e., a permeate pressure, and A is a Joule-Thomson coefficient, a difference ΔT between a gas temperature on the primary side of the separation membrane, i.e., a feed temperature, and a gas temperature on the secondary side of the separation membrane, i.e., a permeate temperature, is made less than 90% of A·ΔP by setting the Nu number in the mixed gas to be greater than or equal to 2 and less than or equal to 10.

12 Claims, 3 Drawing Sheets

(52) U.S. Cl.
CPC .... *B01D 2053/221* (2013.01); *B01D 2256/10* (2013.01); *B01D 2257/504* (2013.01)

(58) Field of Classification Search
CPC ........ B01D 2257/504; B01D 2311/103; B01D 2311/1031; B01D 2313/221; B01D 2256/245; B01D 2253/108; B01D 2053/224; B01D 1/14; B01D 63/066; B01D 69/08; B01D 69/106; B01D 69/12; B01D 2311/02; Y02C 20/40; B01J 20/28045; B01J 2219/00873; B01J 2219/00907; B01J 2219/30416; F01N 5/02
USPC .............................................................. 95/51
See application file for complete search history.

(56) References Cited

U.S. PATENT DOCUMENTS

2005/0045029 A1* 3/2005 Colling .................. C07C 7/144 96/6
2012/0000358 A1 1/2012 Kawai et al.
2017/0368497 A1 12/2017 Priske
2018/0280866 A1 10/2018 Hasegawa et al.
2018/0369746 A1 12/2018 Hayashi et al.
2020/0114307 A1* 4/2020 Tanaka ...................... C01C 1/12
2021/0016233 A1* 1/2021 Noda .................. B01D 65/003
2022/0003503 A1* 1/2022 Iyer ...................... B01D 71/022
2022/0054973 A1 2/2022 Teratani et al.

FOREIGN PATENT DOCUMENTS

JP H06-319934 A 11/1994
JP 4711425 B2 6/2011
JP 2018-511472 A 4/2018
WO 2017/056134 A1 4/2017
WO 2017/150737 A1 9/2017
WO 2020/157830 A1 8/2020

OTHER PUBLICATIONS

International Search Report and Written Opinion (Application No. PCT/JP2022/020070) dated Jun. 28, 2022 (8 pages).
Chinese Office Action for Chinese Application No. 202280039182.6 dated Mar. 21, 2026.
Chinese Office Action for Chinese Application No. 202280039182.6 dated Jul. 2, 2026.

* cited by examiner

MIXED GAS SEPARATION METHOD AND MIXED GAS SEPARATION APPARATUS

CROSS-REFERENCE TO RELATED APPLICATION

The present application is a continuation application of International Application No. PCT/JP2022/020070 filed on May 12, 2022, which claims the benefit of priority to Japanese Patent Application No. 2021-093576 filed on Jun. 3, 2021. The entire contents of these applications are incorporated herein by reference.

TECHNICAL FIELD

The present invention relates to a mixed gas separation method and a mixed gas separation apparatus.

BACKGROUND ART

Various studies and developments are currently underway on separation, adsorption, or the like of specific molecules using a separation membrane such as a zeolite membrane.

For example, International Publication No. 2017/150737 (Document 1) proposes a technique used in cases of supplying a mixed gas to a separation membrane module to separate carbon dioxide from the mixed gas, in which the mixed gas is supplied at a high linear velocity (in a turbulent state) to the separation membrane module in order to sufficiently mix the mixed gas in the vicinity of the separation membrane and efficiently separate carbon dioxide from the mixed gas.

Japanese Patent No. 4711425 (Document 2) proposes a technique used in an exhaust emission control device that cleans up an exhaust gas emitted from an internal combustion engine, the technique being used to separate components having a high reducing power, such as n-paraffin, from hydrocarbon contained in a fuel such as light oil through a separation membrane and supply the separated high-reducing power components to a catalyst for clarification of nitrogen oxides. The exhaust emission control device allows efficient separation of components having a high reducing power by heating the aforementioned separation membrane.

A separation membrane that separates a gas with high permeability (i.e., high-permeability gas) from a mixed gas is often used under high differential pressure conditions in order to increase the permeance of high-permeability gas, the high differential pressure conditions being conditions under which there is a large difference between a gas pressure on the primary side (i.e., feed pressure) to which the mixed gas is supplied and a gas pressure on the secondary side (i.e., permeate pressure) after passage of the high-permeability gas.

In the case where a separation membrane is used under high differential pressure conditions, the temperature of a gas that permeates through the separation membrane may drop due to a reduced pressure, and this may result in degradation of gas diffusion properties of the separation membrane and a decrease in permeance. There is also a risk of decrease in permeance as a result of condensation of the gas whose temperature has dropped during permeation of the gas through the separation membrane and resultant clogging of pores in the separation membrane. Meanwhile, if the mixed gas is heated to a high temperature in order to prevent gas condensation in the separation membrane, the high-permeability gas may have a lower property of adsorbing to the surface of the separation membrane and this may result in a decrease in permeance.

SUMMARY OF THE INVENTION

The present invention is intended for a mixed gas separation method, and it is an object of the present invention to suppress a decrease in permeance to a permeated gas.

A mixed gas separation method according to one preferable embodiment of the present invention includes a) preparing a separation membrane and b) supplying a mixed gas that contains a plurality of types of gases to the separation membrane and causing a gas with high permeability in the mixed gas to permeate through the separation membrane to separate the gas with high permeability from the mixed gas. In the operation b), when $\Delta P$ is a difference between a feed pressure and a permeate pressure, the feed pressure being a gas pressure on a primary side of the separation membrane, the permeate pressure being a gas pressure on a secondary side of the separation membrane, and A is a Joule-Thomson coefficient, a difference $\Delta T$ between a feed temperature and a permeate temperature, the feed temperature being a gas temperature on the primary side of the separation membrane, the permeate temperature being a gas temperature on the secondary side of the separation membrane, is made less than 90% of $A \cdot \Delta P$ by setting an Nu number in the mixed gas to be greater than or equal to 2 and less than equal to 10.

According to the mixed gas separation method described above, it is possible to suppress a decrease in permeance to the permeated gas.

Preferably, in the operation b), the difference $\Delta P$ between the feed pressure and the permeate pressure is greater than or equal to 3.0 MPa.

Preferably, a gradient of an Nu plot relative to U is greater than or equal to 1 and less than or equal to 5, where Nu is the Nu number in the mixed gas and U is a linear velocity (m/sec) of the mixed gas.

Preferably, in the operation b), the separation membrane is heated from a permeate side.

Preferably, in the operation b), a space on the permeate side of the separation membrane is insulated from an ambient atmosphere having a lower temperature than the space on the permeate side.

Preferably, the difference $\Delta T$ between the feed temperature and the permeate temperature is less than 60% of $A \cdot \Delta P$.

Preferably, the separation membrane has a tube-like shape, and the separation membrane has an equivalent diameter of greater than or equal to 2 mm and less than or equal to 5 mm.

Preferably, the separation membrane has a cylinder-like shape into which the mixed gas is supplied, and the equivalent diameter is an inner diameter of the separation membrane.

Preferably, the separation membrane is a zeolite membrane.

More preferably, the zeolite membrane is composed of a zeolite in which an 8-membered ring is maximum.

Preferably, a permeated gas that permeates through the separation membrane includes a condensable gas.

Preferably, the mixed gas includes one or more kinds of substances selected from among a group consisting of hydrogen, helium, nitrogen, oxygen, water, water vapor, carbon monoxide, carbon dioxide, nitrogen oxides, ammonia, sulfur oxides, hydrogen sulfides, sulfur fluorides, mercury, arsine, hydrogen cyanides, carbonyl sulfides, C1 to C8 hydrocarbons, organic acids, alcohol, mercaptans, ester, ether, ketone, and aldehyde.

The present invention is also intended for a mixed gas separation apparatus. A mixed gas separation apparatus according to one preferable embodiment of the present invention includes a separation membrane and a supplier that supplies a mixed gas that contains a plurality of types of gases to the separation membrane. The separation membrane separates a gas with high permeability in the mixed gas from the mixed gas by passing the gas with high permeability therethrough, and when $\Delta P$ is a difference between a feed pressure and a permeate pressure, the feed pressure being a gas pressure on a primary side of the separation membrane, the permeate pressure being a gas pressure on a secondary side of the separation membrane, and A is a Joule-Thomson coefficient, a difference $\Delta T$ between a feed temperature and a permeate temperature, the feed temperature being a gas temperature on the primary side of the separation membrane, the permeate temperature being a gas temperature on the secondary side of the separation membrane, is made less than 90% of $A \cdot \Delta P$ by setting an Nu number in the mixed gas to be greater than or equal to 2 and less than or equal to 10.

These and other objects, features, aspects and advantages of the present invention will become more apparent from the following detailed description of the present invention when taken in conjunction with the accompanying drawings.

DETAILED DESCRIPTION

Figure 1:
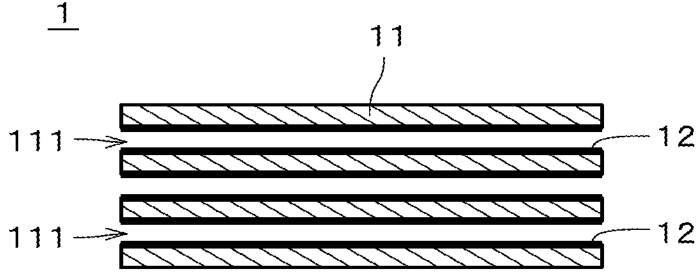
FIG. 1 is a sectional view of a separation membrane complex according to one embodiment.
Figure 2:
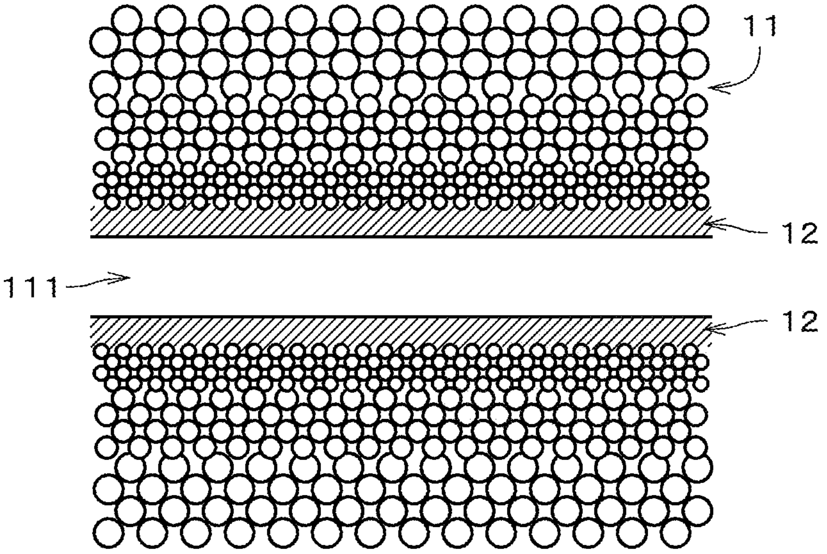
FIG. 2 is a sectional view showing part of the separation membrane complex in enlarged dimensions.

FIG. 1 is a sectional view of a separation membrane complex 1 according to one embodiment of the present invention. FIG. 2 is a sectional view showing part of the separation membrane complex 1 in enlarged dimensions. The separation membrane complex 1 includes a support 11 and a separation membrane 12. In FIG. 1, the separation membrane 12 is illustrated with thick lines. In FIG. 2, the separation membrane 12 is hatched, and the thickness of the separation membrane 12 is illustrated greater than the actual thickness of the separation membrane.

The support 11 is a porous member that is permeable to gas and liquid. In the example shown in FIG. 1, the support 11 is an integrally-molded approximately-column-like member. The support 11 has a plurality of through holes 111 each extending in the longitudinal direction of the support. That is, the support 11 is a so-called monolith member. The outside shape of the support 11 may, for example, be an approximately column-like shape. Each through hole 111 (i.e., cell) may have an approximately circular section perpendicular to the longitudinal direction. In FIG. 1, the diameter of the through holes 111 is illustrated greater than the actual diameter of the through holes, and the number of through holes 111 is illustrated smaller than the actual number of through holes.

The support 11 may have a length (i.e., length in the right-left direction in FIG. 1) of, for example, 10 cm to 200 cm. The outside diameter of the support 11 may be in the range of, for example, 0.5 cm to 30 cm. The distance between the central axes of each pair of adjacent through holes 111 may be in the range of, for example, 0.3 mm to 10 mm. The surface roughness (Ra) of the support 11 may be in the range of, for example, 0.1 μm to 5.0 μm and preferably 0.2 μm to 2.0 μm. Note that the support 11 may have any other shape such as a honeycomb shape, a flat plate-like shape, a tube-like shape, a cylinder-like shape, a column-like shape, or a prism shape. In the case where the support 11 has a tube- or cylinder-like shape, the thickness of the support 11 may be in the range of, for example, 0.1 mm to 10 mm.

The material for the support 11 may be any of various substances (e.g., ceramic or metal) as long as the substance has chemical stability during the process of forming the separation membrane 12 on the surface. In the present embodiment, the support 11 is formed of a ceramic sintered body. Examples of the ceramic sintered body selected as the material for the support 11 include alumina, silica, mullite, zirconia, titania, yttria, silicon nitride, and silicon carbide. In the present embodiment, the support 11 contains at least one kind of substances selected from among the group consisting of alumina, silica, and mullite.

The support 11 may contain an inorganic binding material. The inorganic binding material may, for example, be at least one selected from among the group consisting of titania, mullite, easily sinterable alumina, silica, glass frit, clay minerals, and easily sinterable cordierite.

The support 11 may have a mean pore diameter of, for example, 0.01 μm to 70 μm and preferably 0.05 μm to 25 μm. The mean pore diameter of the support 11 in the vicinity of the surface on which the separation membrane 12 is formed may be in the range of 0.01 μm to 1 μm and preferably 0.05 μm to 0.5 μm. The mean pore diameter may be measured by, for example, a mercury porosimeter, a perm-porometer, or a nano-perm-porometer. Referring to the pore size distribution of the support 11 as a whole including the surface and the interior, D5 may be in the range of, for example, 0.01 μm to 50 μm, D50 may be in the range of, for example, 0.05 μm to 70 μm, and D95 may be in the range of, for example, 0.1 μm to 2000 μm. The support 11 may have a porosity of, for example, 20% to 60% in the vicinity of the surface on which the separation membrane 12 is formed.

For example, the support 11 may have a multilayer structure in which a plurality of layers having different mean pore diameters are laminated one above another in the thickness direction. A mean pore diameter and a sintered particle size in a surface layer including the surface on which the separation membrane 12 is formed are smaller than those in layers other than the surface layer. The mean pore diameter in the surface layer of the support 11 may be in the range of, for example, 0.01 μm to 1 μm and preferably 0.05 μm to 0.5 μm. In the case where the support 11 has a multilayer structure, the material for each layer may be any of the substances described above. The layers configuring the multilayer structure may be formed of the same material, or may be formed of different materials.

The separation membrane 12 is an approximately cylinder-like thin membrane formed on approximately the entire inside surfaces of the through holes 111 of the support 11. The separation membrane 12 is a dense porous membrane with micropores. The separation membrane 12 is capable of separating a specific gas from a mixed gas of a plurality of types of gases by using a molecular-sieving function.

In the present embodiment, the separation membrane 12 is a zeolite membrane. The zeolite membrane refers to at least a zeolite formed into a membrane on the surface of the support 11, and does not refer to zeolite particles that are merely dispersed in an organic membrane. As described above, the zeolite membrane can be used as a separation membrane for separating a specific substance from a mixed gas. The zeolite membrane is less permeable to gases other than the specific gas. In other words, the permeance of the zeolite membrane to the other gases is lower than the permeance of the zeolite membrane to the aforementioned specific gas. Note that the zeolite membrane may contain two or more kinds of zeolites having different structures or compositions.

The inner diameter of an approximately cylinder-like separation membrane 12 placed in each through hole 111 (i.e., the inner diameter of the through holes 11) may, for example, be greater than or equal to 2 mm and preferably greater than or equal to 2.5 mm. There are no particular limitations on the upper limit for the inner diameter of the separation membrane 12, but the upper limit value may, for example, be less than or equal to 5 mm and preferably less than or equal to 4 mm.

Although in the present embodiment, the separation membrane 12 has an approximately cylinder-like shape as described above, the sectional shape of the separation membrane 12 perpendicular to the longitudinal direction may be a non-circular tube-like shape (e.g., an approximately elliptical or rectangular shape). In this way, in the case where the separation membrane 12 has a tube-like shape, the equivalent diameter of the separation membrane 12 may, for example, be greater than or equal to 2 mm and preferably greater than or equal to 2.5 mm. The equivalent diameter may also be, for example, less than or equal to 5 mm and preferably less than or equal to 4 mm. The equivalent diameter is obtained by dividing four times the inside cross-sectional area of the separation membrane 12 by the wetted perimeter of the separation membrane 12 (in this case, the inner perimeter) in a section perpendicular to the longitudinal direction of the separation membrane 12. In the present embodiment, since the separation membrane 12 has an approximately cylinder-like shape, the aforementioned equivalent diameter corresponds to the inner diameter of the separation membrane 12.

The thickness of the separation membrane 12 may be in the range of, for example, 0.05 μm to 30 μm, preferably 0.1 μm to 20 μm, and more preferably 0.5 μm to 10 μm. Increasing the thickness of the separation membrane 12 improves separation performance. Reducing the thickness of the separation membrane 12 increases permeance. The surface roughness (Ra) of the separation membrane 12 may, for example, be less than or equal to 5 μm, preferably less than or equal to 2 μm, more preferably less than or equal to 1 μm, and yet more preferably less than or equal to 0.5 μm.

The pore sizes of zeolite crystals contained in the separation membrane 12 (hereinafter, also simply referred to as the "pore sizes in the separation membrane 12") are greater than or equal to 0.2 nm and less than or equal to 0.8 nm, more preferably greater than or equal to 0.3 nm and less than or equal to 0.7 nm, and yet more preferably greater than or equal to 0.3 nm and less than or equal to 0.45 nm. In the case where the pore sizes in the separation membrane 12 are less than 0.2 nm, the amount of gas permeating through the separation membrane 12 may be reduced, whereas in the case where the pore sizes in the separation membrane 12 are greater than 0.8 nm, the separation membrane 12 may have insufficient gas selectivity. The pore sizes in the separation membrane 12 refer to the diameters (minor axes) of small pores in a direction approximately perpendicular to the maximum diameter of small pores in the zeolite crystals of the separation membrane 12 (i.e., major axes that take the maximum value for the distance between oxygen atoms). The pore sizes in the separation membrane 12 are smaller than the mean pore diameter in the surface of the support 11 on which the separation membrane 12 is formed.

In the case where the zeolite membrane 12 is composed of a zeolite in which an n-membered ring is maximum, the minor axis of the n-numbered ring pore is assumed to be the pore size in the zeolite membrane 12. In the case where the zeolite has a plurality of types of n-membered ring pores where n is the same number, the minor axis of n-membered ring pores that have a largest minor axis is assumed to be the pore size in the zeolite membrane 12. Note that the n-membered ring refers to a ring in which the number of oxygen atoms constituting the framework of a pore is n and each oxygen atom is bonded to a T atom described later to form a cyclic structure. The n-membered ring also refers to a ring that forms a through hole (channel), and does not refer to a ring that fails to form a through hole. The n-membered ring pore refers to a small pore formed of an n-membered ring. From the viewpoint of improving selectivity, the zeolite membrane 12 described above may preferably contain a zeolite in which 8- or less-membered ring is maximum (e.g., 6- or 8-membered ring zeolite).

The pore sizes in the separation membrane 12, which is the zeolite membrane, are uniquely determined by the framework structure of the zeolite and obtained from values disclosed in "Database of Zeolite Structures" [online], by International Zeolite Association, Internet <URL:http://www.iza-structure.org/databases/.

There are no particular limitations on the type of the zeolite of the zeolite membrane 12, and examples of the zeolite include AEI-, AEN-, AFN-, AFV-, AFX-, BEA-, CHA-, DDR-, ERI-, ETL-, FAU- (X-type, Y-type), GIS-, IHW-, LEV-, LTA-, LTJ-, MEL-, MFI-, MOR-, PAU-, RHO-, SOD-, and SAT-type zeolites. In the case where the zeolite is an 8-membered ring zeolite, examples of the zeolite include AEI-, AFN-, AFV-, AFX-, CHA-, DDR-, ERI-, ETL-, GIS-, IHW-, LEV-, LTA-, LTJ-, RHO-, and SAT-type zeolites.

The zeolite of the separation membrane 12 may contain, for example, at least one of silicon (Si), aluminum (Al), and phosphorus (P) as T atoms (i.e., atoms located in the center of an oxygen tetrahedron ($TO_4$) constituting the zeolite). The zeolite of the separation membrane 12 may, for example, be a zeolite that contains only silicon (Si) as T atoms or that contains Si and Al as T atoms, an ALPO-type zeolite that contains Al and P as T atoms, an SAPO-type zeolite that contains Si, Al, and P as T atoms, an MAPSO-type zeolite that contains magnesium (Mg), Si, Al, and P as T atoms, or a ZnAPSO-type zeolite that contains zinc (Zn), Si, Al, and P as T atoms. Some of the T atoms may be replaced by other elements.

The zeolite membrane 12 may contain, for example, Si. For example, the zeolite membrane 12 may contain any two or more of Si, Al, and P. The zeolite membrane 12 may contain alkali metal. The alkali metal may, for example, be sodium (Na) or potassium (K). In the case where the zeolite membrane 12 contains Si atoms and Al atoms, the Si/Al ratio in the zeolite membrane 12 may, for example, be higher than or equal to one and lower than or equal to a hundred thousand. The Si/Al ratio refers to the molar ratio of Si elements to Al elements contained in the zeolite membrane 12. The Si/Al ratio may preferably be higher than or equal to 5, more preferably higher than or equal to 20, and yet more preferably higher than or equal to 100. A higher Si/Al ratio is more preferable. The Si/Al ratio in the zeolite membrane 12 can be adjusted by, for example, adjusting the compounding ratio of an Si source and an Al source in a starting material solution, which will be described later.

In the separation membrane complex 1, the separation membrane 12 may further include, in addition to the zeolite membrane, a membrane other than the zeolite membrane. Alternatively, the separation membrane 12 may be a membrane other than the zeolite membrane.

Figure 3:
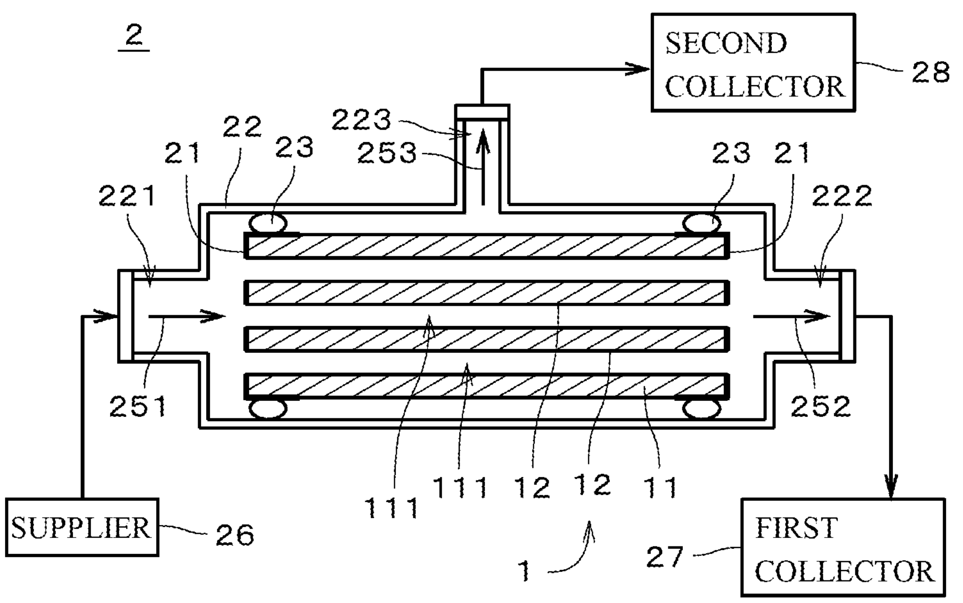
FIG. 3 shows a separation apparatus.
Figure 4:
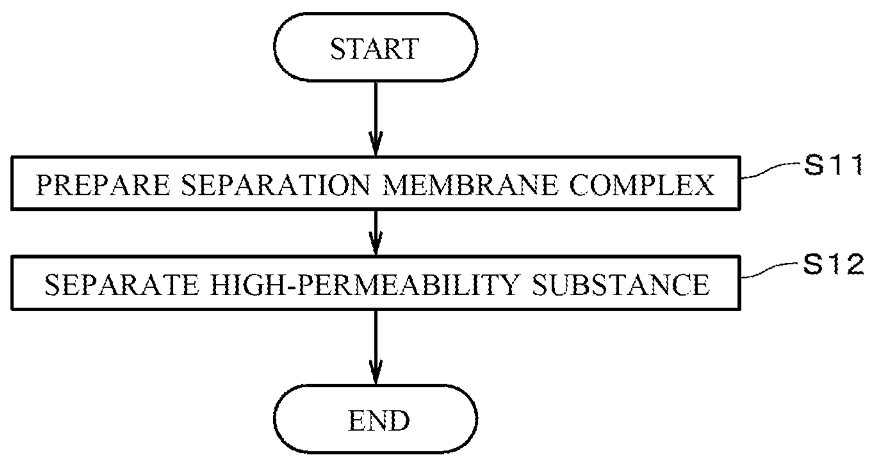
FIG. 4 is a flowchart showing a procedure for separating a mixed gas.

Next, the separation of a mixed gas using the separation membrane complex 1 will be described with reference to FIGS. 3 and 4. FIG. 3 is a diagram showing a mixed gas separation apparatus 2 (hereinafter, simply referred to as the "separation apparatus 2"). FIG. 4 is a flowchart showing the procedure for separating a mixed gas by the separation apparatus 2.

The separation apparatus 2 supplies a mixed gas including a plurality of types of gases to the separation membrane complex 1 and causes a gas with high permeability in the mixed gas to permeate through the separation membrane complex 1 to separate the gas with high permeability from the mixed gas. The separation by the separation apparatus 2 may be performed for the purpose of extracting a gas with high permeability (hereinafter, also referred to as a "high-permeability gas") from the mixed gas or for the purpose of condensing a gas with low permeability (hereinafter, referred to as a "low-permeability gas"). The separation apparatus 2 may be used to, for example, separate an exhaust gas emitted in integrated coal gasification combined cycle power generation (IGCC).

The mixed gas may contain, for example, one or more kinds of substances selected from among the group consisting of hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxides, ammonia ($NH_3$), sulfur oxides, hydrogen sulfides ($H_2S$), sulfur fluorides, mercury (Hg), arsine ($AsH_3$), hydrogen cyanides (HCN), carbonyl sulfides (COS), C1 to C8 hydrocarbons, organic acids, alcohol, mercaptans, ester, ether, ketone, and aldehyde. The aforementioned high-permeability substance may, for example, be one or more kinds of substances selected from among the group consisting of $H_2$, He, $N_2$, $O_2$, $H_2O$, $CO_2$, $NH_3$, and $H_2S$.

Nitrogen oxides are compounds of nitrogen and oxygen. For example, the aforementioned nitrogen oxides may be gas called NOx such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), or dinitrogen pentoxide ($N_2O_5$).

Sulfur oxides are compounds of sulfur and oxygen. For example, the aforementioned sulfur oxides may be gas called SOX such as sulfur dioxide ($SO_2$) or sulfur trioxide ($SO_3$).

Sulfur fluorides are compounds of fluorine and sulfur. For example, the aforementioned sulfur fluorides may be disulfur difluoride (F—S—S—F, S═$SF_2$), sulfur difluoride ($SF_2$), sulfur tetrafluoride ($SF_4$), sulfur hexafluoride ($SF_6$), or disulfur decafluoride ($S_2F_{10}$).

C1 to C8 hydrocarbons are hydrocarbons that contain one or more and eight or less carbon atoms. C3 to C8 hydrocarbons each may be any of a linear-chain compound, a side-chain compound, and a cyclic compound. C2 to C8 hydrocarbons each may be either of a saturated hydrocarbon (i.e., where double bonds and triple bonds are not located in molecules) and an unsaturated hydrocarbon (i.e., where double bonds and/or triple bonds are located in molecules). C1 to C4 hydrocarbons may, for example, be methane ($CH_4$), ethane ($C_2H_6$), ethylene ($C_2H_4$), propane ($C_3H_8$), propylene ($C_3H_6$), normal butane ($CH_3(CH_2)_2CH_3$), isobutene ($CH(CH_3)_3$), 1-butene ($CH_2$═$CHCH_2CH_3$), 2-butene ($CH_3CH$═$CHCH_3$), or isobutene ($CH_2$═$C(CH_3)_2$).

The aforementioned organic acids may, for example, be carboxylic acid or sulfonic acid. The carboxylic acid may, for example, be formic acid ($CH_2O_2$), acetic acid ($C_2H_4O_2$), oxalic acid ($C_2H_2O_4$), acrylic acid ($C_3H_4O_2$), or benzoic acid ($C_6H_5COOH$). The sulfonic acid may, for example, be ethane sulfonic acid ($C_2H_6O_3S$). The organic acid may be a chain compound, or may be a cyclic compound.

The aforementioned alcohol may, for example, be methanol ($CH_3OH$), ethanol ($C_2H_5OH$), isopropanol (2-propanol) ($CH_3CH(OH)CH_3$), ethylene glycol ($CH_2(OH)CH_2(OH)$), or butanol ($C_4H_9OH$).

Mercaptans are organic compounds with terminal sulfur hydrides (SH) and are also substances called thiol or thioalcohol. The aforementioned mercaptans may, for example, be methyl mercaptan ($CH_3SH$), ethyl mercaptan ($C_2H_5SH$), or 1-propane thiol ($C_3H_7SH$).

The aforementioned ester may, for example, be formic acid ester or acetic acid ester.

The aforementioned ether may, for example, be dimethyl ether ($(CH_3)_2O$), methyl ethyl ether ($C_2H_5OCH_3$), or diethyl ether ($(C_2H_5)_2O$).

The aforementioned ketone may, for example, be acetone ($(CH_3)_2CO$), methyl ethyl ketone ($C_2H_5COCH_3$), or diethyl ketone ($(C_2H_5)_2CO$).

The aforementioned aldehyde may, for example, be acetaldehyde ($CH_3CHO$), propionaldehyde ($C_2H_5CHO$), or butanal (butyraldehyde) ($C_3H_7CHO$).

The separation apparatus 2 includes the separation membrane complex 1, a sealer 21, a housing 22, two seal members 23, a supplier 26, a first collector 27, and a second collector 28. The separation membrane complex 1, the sealer 21, and the seal members 23 are placed in the housing 22. The supplier 26, the first collector 27, and the second collector 28 are arranged outside the housing 22 and connected to the housing 22.

The sealer 21 is a member that is attached to both ends of the support 11 in the longitudinal direction (i.e., the left-right direction in FIG. 3) to cover and seal both end faces of the support 11 in the longitudinal direction and the outer surface of the support 11 in the vicinity of the both end faces. The sealer 21 prevents inflow and outflow of gas and liquid from the both end faces of the support 11. For example, the sealer 21 may be a plate-like or membranous member formed of glass or a resin. The material and shape of the sealer 21 may be appropriately changed. Note that the sealer 21 has a plurality of openings that overlap the plurality of through holes 111 of the support 11, so that both ends in the longitudinal direction of each through hole 111 of the support 11 are not covered with the sealer 21. This allows the inflow and outflow of gas and liquid from the both ends of each through hole 111 into and out of the through hole.

There are no particular limitations on the shape of the housing 22, and the housing 22 may, for example, be an approximately cylinder-like tubular member. For example, the housing 22 may be formed of stainless steel or carbon steel. The longitudinal direction of the housing 22 is approximately parallel to the longitudinal direction of the separation membrane complex 1. One end in the longitudinal direction of the housing 22 (i.e., the end on the left side in FIG. 3) is provided with a supply port 221, and the other end thereof is provided with a first exhaust port 222. The side face of the housing 22 is provided with a second exhaust port 223. The supply port 221 is connected to the supplier 26. The first exhaust port 222 is connected to the first collector 27. The second exhaust port 223 is connected to the second collector 28. The internal space of the housing 22 is an enclosed space isolated from the space around the housing 22.

The two seal members 23 are arranged along the entire circumference between the outer surface of the separation membrane complex 1 and the inside surface of the housing 22 in the vicinity of the both ends of the separation membrane complex 1 in the longitudinal direction. Each seal member 23 is an approximately ring-shaped member formed of a material that is impermeable to gas and liquid. For example, the seal members 23 may be O-rings formed of a resin having flexibility. The seal members 23 are in tight contact with the outer surface of the separation membrane complex 1 and the inside surface of the housing 22 along the entire circumference. In the example shown in FIG. 3, the seal members 23 are in tight contact with the outer surface of the sealer 21 and in indirect tight contact with the outer surface of the separation membrane complex 1 via the sealer 21. The part between the seal members 23 and the outer surface of the separation membrane complex 1 and the part between the seal members 23 and the inside surface of the housing 22 are sealed so as to almost or completely disable permeation of gas and liquid.

The supplier 26 supplies a mixed gas to the internal space of the housing 22 via the supply port 221. The supplier 26 may include, for example, a pumping mechanism such as a blower or pump that pumps the mixed gas toward the housing 22. The pumping mechanism may include, for example, a temperature controller and a pressure regulator that respectively control the temperature and pressure of the mixed gas to be supplied to the housing 22. The first collector 27 and the second collector 28 may include, for example, a reservoir that stores the gas delivered from the housing 22, or a blower or a pump that transfers this gas.

In the separation of the mixed gas, first, the separation membrane complex 1 is prepared (step S11 in FIG. 4). Specifically, the separation membrane complex 1 is mounted on the inside of the housing 22. Then, the mixed gas including a plurality of types of gases having different permeability in the zeolite membrane 12 is supplied from the supplier 26 to the inside of the housing 22 as indicated by an arrow 251. The mixed gas may be composed primarily of, for example, $CO_2$ and $N_2$. The mixed gas may also include a gas other than $CO_2$ and $N_2$. The pressure of the mixed gas supplied from the supplier 26 to the inside of the housing 22 (i.e., feed pressure that is a gas pressure on the primary side of the separation membrane 12) may be in the range of, for example, 0.1 MPaG to 20.0 MPaG. The temperature of the mixed gas supplied from the supplier 26 may be in the range of, for example, 10° C. to 250° C. and preferably 20° C. to 150° C.

The mixed gas supplied from the supplier 26 to the housing 22 is introduced from the left end of the separating membrane complex 1 in the drawing into each through hole 111 of the support 11 (i.e., to the inside of the approximately cylinder-like separation membrane 12). A gas with high permeability in the mixed gas, i.e., high-permeability gas, is derived from the outer surface of the support 11 through the separation membrane 12 formed on the inside surface of each through hole 111 and the support 11. Accordingly, the high-permeability gas (e.g., $CO_2$) is separated from a gas with low permeability in the mixed gas, i.e., low-permeability gas, (e.g., $N_2$) (step S12).

The gas derived from the outer surface of the support 11 (hereinafter, also referred to as the "permeated gas") is guided to the second collector 28 via the second exhaust port 223 as indicated by an arrow 253 and collected by the second collector 28. The pressure of the gas collected by the second collector 28 (i.e., permeate pressure that is a gas pressure on the secondary side of the separation membrane 12) may, for example, be 0.0 MPaG. In other words, the difference between the feed pressure and the permeate pressure may be in the range of, for example, 0.1 MPa to 20.0 MPa. Preferably, the difference between the feed pressure and the permeate pressure may be greater than or equal to 3.0 MPa. The permeated gas may further include, in addition to the aforementioned high-permeability gas, a low-permeability gas that has permeated through the separation membrane 12.

In the mixed gas, a gas other than the gas that has permeated through the separation membrane 12 and the support 11 (hereinafter, also referred to as a "non-permeated gas") permeates through each through hole 111 of the support 11 from the left side to the right side in the drawing and collected by the first collector 27 via the first exhaust port 222 as indicated by an arrow 252. The pressure of the gas collected by the first collector 27 may, for example, be approximately the same as the feed pressure. The non-permeated gas may further include, in addition to the aforementioned low-permeability gas, a high-permeability gas that has not permeated through the separation membrane 12. For example, the non-permeated gas collected by the first collector 27 may be circulated by the supplier 26 and supplied again to the inside of the housing 22.

As described above, when the mixed gas is separated under high differential pressure conditions in which there is a large difference between the feed pressure and the permeate pressure, conventionally the temperature of the gas that has permeated through the separation membrane has been reduced by the Joule-Thomson effect (also called the JT effect). Thus, the gas temperature on the secondary side of the separation membrane, i.e., a permeate temperature (i.e., the temperature of the permeated gas), becomes lower than the gas temperature on the primary side of the separation membrane, i.e., a feed temperature (i.e., the temperature of the mixed gas). In other words, the temperature of the permeated gas is made lower than the temperature of the mixed gas by the Joule-Thomson effect.

In this way, if a temperature drop occurs in the gas permeating through the separation membrane, there is a risk of degradation of gas diffusion properties of the separation membrane and a decrease in permeance. If the mixed gas includes a condensable gas, there is also a risk of decrease in permeance as a result of condensation of the gas whose temperature has dropped during permeation of the gas through the separation membrane and resultant clogging of pores in the separation membrane. The condensable gas as used herein refers to a gas that has a boiling point or sublimation point of higher than or equal to minus 80° C. under normal atmospheric pressure (e.g., $CO_2$ or hydrocarbon). On the other hand, if the temperature of the mixed gas is increased to suppress gas condensation or the like, the high-permeability gas generally becomes less adsorbable in the pores in the surface of the separation membrane. The permeation of the high-permeability gas through the pores are achieved by diffusion of the high-permeability gas inside the pores after adsorption in the pores in the surface of the separation membrane. Even in this case, there is a risk of decrease in permeance.

As a result of diligent studies, the inventors of the present application have found that, if requisites are determined so as to bring the Nusselt number (Nu number) in the mixed gas within an appropriate range, it is possible to reduce the occurrence of a temperature drop in the permeated gas due to the Joule-Thomson effect during permeation through the separation membrane 12 and thereby to suppress a decrease in permeance to the high-permeability gas, without causing an excessive temperature rise in the mixed gas. Specifically, in order to suppress a decrease in permeance, it is necessary to set the Nu number in the mixed gas to be greater than or equal to 2 and less than or equal to 10. In this case, the difference ΔT (° C.) between the feed temperature and the permeate temperature becomes less than 90% of A·ΔP (° C.). Here, A represents the Joule-Thomson coefficient, and ΔP represents the value obtained by subtracting the permeate pressure from the feed pressure.

The Nu number refers to an indicator that indicates the degree of increase in heat transmission capability of a fluid as compared with that in the stationary state. As the Nu number in the mixed gas supplied to the separation membrane 12 increases, the heat transmission capability of the mixed gas increases. When the flow of the mixed gas supplied to the separation membrane 12 is turbulent, the Nu number can be expressed as follows:

$$Nu=0.023Re^{4/5}Pr^{1/3} \quad \text{(Expression 1)}$$

$$Re=U\cdot d/\nu \quad \text{(Expression 2)}$$

$$Pr=\nu/k \quad \text{(Expression 3)}$$

In Expressions 1 to 3, Nu represents the Nu number, Re represents the Reynolds number (Re number), and Pr represents the Prandtl number (Pr number). Moreover, U represents the linear velocity (m/sec) of the mixed gas supplied to the separation membrane 12, and d represents the inner diameter (m) of the approximately cylinder-like separation membrane 12, which is a reference length. As mentioned above, when the separation membrane 12 has a non-circular tube-like section shape perpendicular to the longitudinal direction, the reference length d indicates the equivalent diameter (m) of the separation membrane 12 described above. Furthermore, v represents the kinematic viscosity ($m^2$/sec) of the mixed gas, and k represents the thermal conductivity (J/(sec·m·k)) of the mixed gas.

In the separation of the mixed gas by the aforementioned separation membrane complex 1, the difference ΔT (° C.) between the feed temperature and the permeate temperature may preferably be less than 60% of A·ΔP (° C.) and more preferably less than 10% of A·ΔP (° C.) from the viewpoint of further suppressing a decrease in permeance to the high-permeability gas.

In the separation of the mixed gas by the aforementioned separation membrane complex 1, the gradient when Nu is plotted using U as the horizontal axis (i.e., the gradient of an approximate straight line obtained by the least-squares method: hereinafter also referred to as the "gradient of the Nu (vs) U plot" may preferably be greater than or equal to 1 and more preferably greater than or equal to 1.2. If the gradient of the Nu (vs) U plot is set to be greater than or equal to 1, it is possible to greatly change the Nu number by only slightly changing the linear velocity (i.e., supply speed) of the mixed gas supplied to the separation membrane 12. The gradient of the Nu (vs) U plot may preferably be less than or equal to 5 and more preferably less than or equal to 4. By setting the gradient of the Nu (vs) U plot to be less than or equal to 5, it is possible to suppress excessive variations in the Nu number in response to variations in the supply speed of the mixed gas and to facilitate high-precision control of the Nu number. Note that the gradient of the Nu (vs) U plot is also referred to as the "gradient of the Nu plot relative to U."

Figure 5:
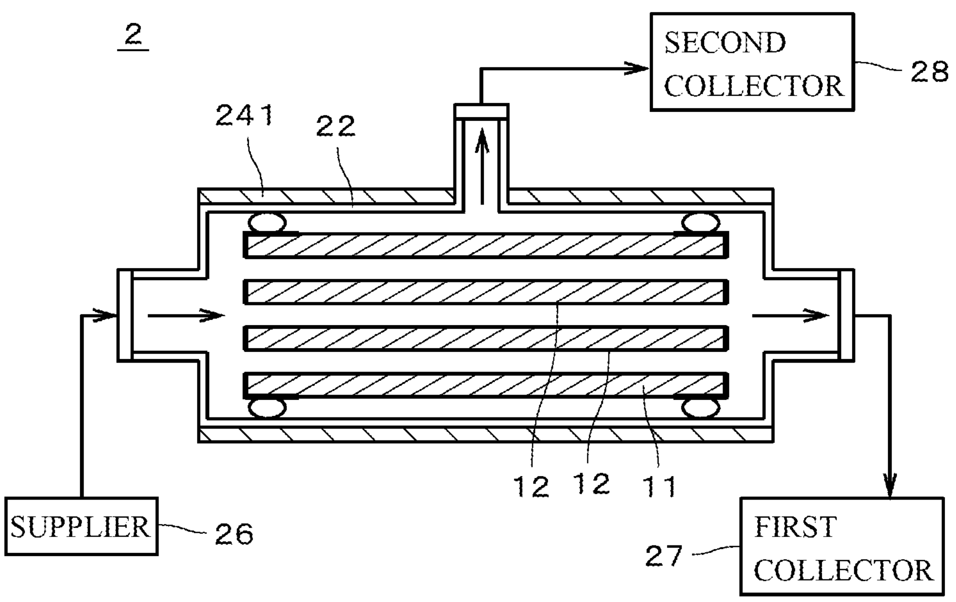
FIG. 5 is a diagram showing the separation apparatus.

As shown in FIG. 5, the separation apparatus 2 described above may further include a heating part 241 that heats the separation membrane 12 from the permeate side of the permeated gas (i.e., heats the separation membrane 12 from the side of the support 11). This further reduces the occurrence of a temperature drop in the permeated gas due to the Joule-Thomson effect described above. In the example shown in FIG. 5, the heating part 241 covers approximately the entire outer surface of the housing 22. For example, the heating part 241 may be a sheet electrothermal heater or a heater that includes a flow path provided to pass a heated fluid along the outer surface of the housing 22.

The temperature of the heating part 241 may, for example, be the same as the temperature of the mixed gas supplied to the separation membrane 12 (i.e., the feed temperature). The temperature of the heating part 241 may also be higher than or lower than the feed temperature. In the case where the temperature of the heating part 241 is lower than the feed temperature, the difference between the feed temperature and the temperature of the heating part 241 may, for example, be less than or equal to 5° C. The temperature of the heating part 241 is higher than the temperature of the permeated gas that has permeated through the separation membrane 12 without being heated by the heating part 241, and the difference between the temperature of the heating part 241 and the temperature of the permeated gas may, for example, be greater than or equal to 10° C.

Figure 6:
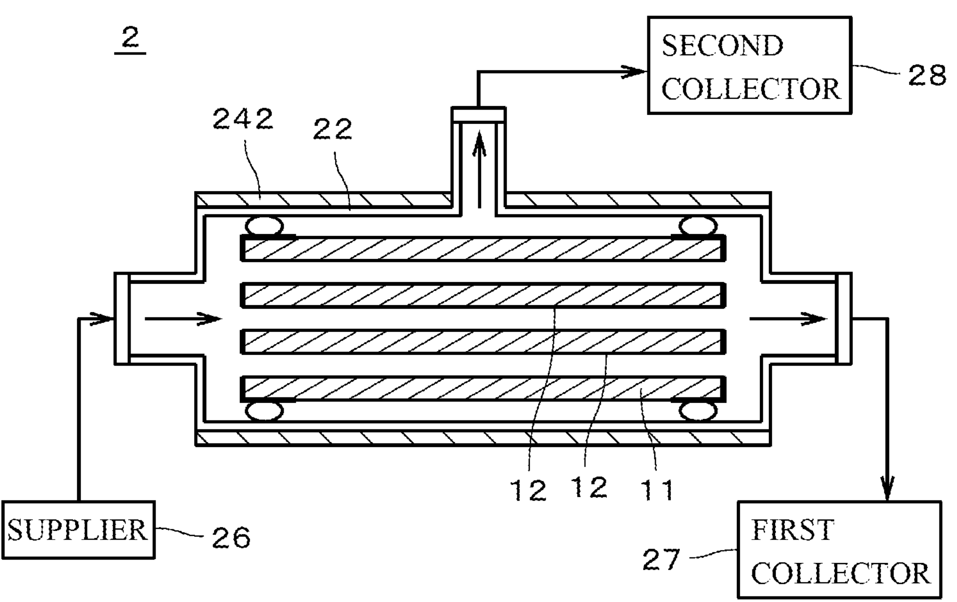
FIG. 6 is a diagram showing the separation apparatus.

As shown in FIG. 6, the separation apparatus 2 described above may further include a heat insulator 242 that insulates the space on the permeate side of the separation membrane 12 (i.e., the space located radially outward of the outer surface of the support 11 inside the housing 22) from the surrounding atmosphere having a lower temperature than the space on the permeate side (i.e., the atmosphere outside the housing 22). Even in this case, it is possible to further reduce the occurrence of a temperature drop in the permeated gas due to the Joule-Thomson effect described above. In the example shown in FIG. 6, the heat insulator 242 covers approximately the entire outer surface of the housing 22. For example, the heat insulator 242 may be a sheet heat insulating material. Note that the heat insulator 242 and the aforementioned heating part 241 may be provided together in the separation apparatus 2. In this case, for example, part of the outer surface of the housing 22 may be covered with the heating part 241, and the remaining part of the outer surface may be covered with the heat insulator 242.

Next, the relationship between the Nu number in the mixed gas and a temperature drop in the permeated gas will be described with reference to Tables 1 and 2. In Examples 1 to 7 and Comparative Examples 1 to 3, a mixed gas that contains 50% by volume of $CO_2$ and 50% by volume of $N_2$ was supplied to the separation apparatus 2. A high-permeability gas in the mixed gas was $CO_2$, and a low-permeability gas was $N_2$.

TABLE 1

| | Differential Pressure ΔP (MPa) | Heating | Heat Insulation | Nu Number | Ambient Temperature (° C.) | Feed Temperature (° C.) | Permeate Temperature (° C.) |
|---|---|---|---|---|---|---|---|
| Example 1 | 8 | Done | Done | 9 | 0 | 60 | 57 |
| Example 2 | 8 | Done | Done | 5 | 0 | 60 | 55 |
| Example 3 | 8 | — | — | 5 | 0 | 60 | 40 |
| Example 4 | 8 | Done | Done | 2 | 0 | 60 | 30 |
| Example 5 | 8 | — | Done | 2 | 0 | 60 | 25 |
| Example 6 | 4 | Done | Done | 5 | 0 | 40 | 35 |
| Comparative Example 1 | 8 | — | — | 1.5 | 0 | 60 | 2 |
| Comparative Example 2 | 4 | — | — | 1.5 | 0 | 40 | 5 |

TABLE 2

| | Permeance ($nmol/m^2 \cdot s \cdot Pa$) | A · ΔP (° C.) | Temperature Difference Δ T (° C.) | ΔT/(A · ΔP) (%) |
|---|---|---|---|---|
| Example 1 | 102 | 64 | 3 | 5 |
| Example 2 | 100 | 64 | 5 | 8 |
| Example 3 | 80 | 64 | 20 | 31 |
| Example 4 | 70 | 64 | 30 | 47 |
| Example 5 | 60 | 64 | 35 | 55 |
| Example 6 | 75 | 38 | 5 | 13 |
| Comparative Example 1 | 30 | 64 | 58 | 91 |
| Comparative Example 2 | 35 | 38 | 35 | 92 |

TABLE 3

| Example 7 | | Comparative Example 3 | |
|---|---|---|---|
| Linear Velocity U (m/s) | Nu | Linear Velocity U (m/s) | Nu |
| 1 | 2.3 | 1 | 1.3 |
| 2 | 3.7 | 2 | 2.1 |
| 3 | 5.6 | 3 | 3.2 |

In Table 1, "Differential Pressure ΔP" represents the difference between the feed pressure and the permeate pressure in the separation apparatus 2 as described above. In the field of "Heating," "Done" indicates that the heating part 241 performed heating (see FIG. 5), and "-" indicates that the heating part 241 did not perform heating. In the field of "Heat Insulation," "Done" indicates that the heat insulator 242 performed heat insulation (see FIG. 6), and "-" indicates that the heat insulator 242 did not perform heat insulation. The heating temperature by the heating part 241 was 60° C. As the heat insulator 242, a heat insulating material having a thickness of 20 mm and heat insulation properties (thermal conductivity) of 0.05 W/(m·K) was used. The temperature around the separation apparatus 2 (hereinafter, also referred to as the "ambient temperature") was 0° C. In Table 1, "Nu Number" was obtained from Expressions 1 to 3 described above.

In Table 2, "Permeance" represents the permeance to the high-permeability gas (i.e., $CO_2$) obtained by measuring the permeated gas by a mass flow meter (MFM) and a gas chromatograph. "Temperature Difference ΔT" represents the difference between the feed temperature and the permeate temperature in Table 1.

In Example 1, the differential pressure ΔP was 8.0 MPa, and heating and heat insulation were conducted respectively by the heating part 241 and the heat insulator 242. The Nu number of the mixed gas was set to 9, and the feed temperature was set to 60° C. As a result, the permeate temperature was 57° C., and ΔT was 3° C. The value of the Joule-Thomson coefficient A was 8, A·ΔP was 64° C., and ΔT was 5% of A·ΔP. In other words, ΔT/(A·ΔP) was 5%. The permeance was 102 nmol/($m^2$·sec·Pa) and high.

Example 2 was the same as Example 1, except that the Nu number was set to 5. The permeate temperature was 55° C., and ΔT was 5° C. The value of the Joule-Thomson coefficient A was 8, A·ΔP was 64° C., and ΔT was 8% of A·ΔP. The permeance was 100 nmol/($m^2$·sec·Pa) and high.

Example 3 was the same as Example 2, except that neither the heating nor the heat insulation described above were performed. The permeate temperature was 40° C., and ΔT was 20° C. The value of the Joule-Thomson coefficient A was 8, A·ΔP was 64° C., and ΔT was 31% of A·ΔP. The permeance was 80 nmol/($m^2$·sec·Pa) and high.

Example 4 was the same as Example 1, except that the Nu number was set to 2. The permeate temperature was 30° C., and ΔT was 30° C. The value of the Joule-Thomson coefficient A was 8, A·ΔP was 64° C., and ΔT was 47% of A·ΔP. The permeance was 70 nmol/($m^2$·sec·Pa) and high.

Example 5 was the same as Example 4, except that the heating described above was not performed. The permeate temperature was 25° C., and ΔT was 35° C. The value of the Joule-Thomson coefficient A was 8, A·ΔP was 64° C., and ΔT was 55% of A·ΔP. The permeance was 60 nmol/($m^2$·sec·Pa) and high.

Example 6 was the same as Example 2, except that the differential pressure ΔP was set to 4.0 MPa and that the feed temperature was set to 40° C. The permeate temperature was 35° C., and ΔT was 5° C. The value of the Joule-Thomson coefficient A was 9.5, A·ΔP was 38° C., and ΔT was 13% of A·ΔP. The permeance was 75 nmol/($m^2$·sec·Pa) and high.

Comparative Example 1 was the same as Example 3, except that the Nu number was set to 1.5. The permeate temperature was 2° C., and ΔT was 58° C. The value of the Joule-Thomson coefficient A was 8, A·ΔP was 64° C., and ΔT was 91% of A·ΔP. The permeance was 30 nmol/($m^2$·sec·Pa) and low.

Comparative Example 2 was the same as Example 6, except that neither the heating nor the heat insulation described above were performed and that the Nu number was set to 1.5. The permeate temperature was 5° C., and ΔT was 35° C. The value of the Joule-Thomson coefficient A was 9.5, A·ΔP was 38, and ΔT was 92% of A·ΔP. The permeance was 35 nmol/($m^2$·sec·Pa) and lower than that in Example 6.

In Examples 1 to 6, $\Delta T$ less than 90% of $A \cdot \Delta P$ was achieved by setting the Nu number to be greater than or equal to 2 and less than or equal to 10. Thus, a decrease in permeance can be suppressed as compared with Comparative Examples 1 and 2 (the Nu number was less than 2) in which $\Delta T$ was higher than or equal to 90% of $A \cdot \Delta P$. Moreover, in Examples 1 to 6, $\Delta T$ was less than 60% of $A \cdot \Delta P$. Thus, a decrease in permeance can be greatly suppressed as compared with Comparative Examples 1 and 2.

Focusing on Examples 1 to 5 in which the differential pressure $\Delta P$ was 8 MPa, the permeance in Examples 1 and 2, in which $\Delta T$ was less than 10% of $A \cdot \Delta P$, was higher than or equal to 100 nmol/($m^2 \cdot sec \cdot Pa$) and higher than the permeance in Examples 3 to 5 (60 nmol/($m^2 \cdot sec \cdot Pa$)) to 80 nmol/($m^2 \cdot sec \cdot Pa$)), in which $\Delta T$ was 10% more of $A \cdot \Delta P$. Accordingly, a decrease in permeance can be further suppressed by setting $\Delta T$ to be less than 10% of $A \cdot \Delta P$.

In Example 2, the heating by the heating part 241 and the heat insulation by the heat insulator 242 further suppressed a decrease in permeance as compared with that in Example 3 (in which neither the heating nor the heat insulation described above was performed). In Example 4, the heating by the heating part 241 further suppressed a decrease in permeance as compared with that in Example 5 (in which the heating described above was not performed).

In Example 7, the inner diameter of the separation membrane 12 was set to 2 mm, and the linear velocity U of the mixed gas supplied to the separation membrane 12 was varied within the range of 1.0 m/sec to 3.0 m/sec. The differential pressure $\Delta P$ was set to 4.0 MPa. In cases where the linear velocity U was 1.0 m/sec, 2.0 m/sec, and 3.0 m/sec, the Nu number was 2.3, 3.7, and 5.6, respectively. The gradient of the Nu (vs) U plot (i.e., the gradient of the Nu plot relative to U) was 1.5 and greater than or equal to 1 and less than or equal to 5.

Comparative Example 3 was the same as Example 7, except that the inner diameter of the separation membrane 12 was set to 1 mm. In cases where the linear velocity U was 1.0 m/sec, 2.0 m/sec, and 3.0 m/sec, the Nu number was 1.3, 2.1, and 3.2, respectively. The gradient of the Nu (vs) U plot (i.e., the gradient of the Nu plot relative to U) was 0.85 and less than 1.

In Example 7, by setting the gradient of the Nu (vs) U plot in the range of 1 to 5, it is possible to efficiently increase the Nu number with slightly increasing the linear velocity, compared to Comparative Example 3, where the gradient of the Nu (vs) U plot was less than 1. Accordingly, even in the case of separating a large flow of mixed gas, it is possible to more favorably reduce the occurrence of a temperature drop in permeated gas due to the Joule-Thomson effect by only slightly increasing the linear velocity of the mixed gas.

Although, in the mixed gas separation method described above, the mixed gas is supplied to the inside of the separation membrane 12, the mixed gas may be supplied from, for example, outside the tube-like separation membrane 12 formed on the outer surface of a tube-like support. In this case, the equivalent diameter of a flow path of the mixed gas outside the separation membrane 12 is used as the reference length d (m) described above used in obtaining the Nu number. The equivalent diameter is obtained by dividing four times the cross-sectional area of the flow path of the mixed gas outside the separation membrane 12 by the wetted perimeter of the separation membrane 12 (in this case, a total of the outer perimeter of the separation membrane 12 and the inner perimeter of the housing 22) in a section perpendicular to the longitudinal direction of the separation membrane 12. In either case where the mixed gas is supplied from the inside or outside the separation membrane 12, the mixed gas is supplied to the surface side on the side opposite to the support 11 of the separation membrane 12 and permeates through the support 11 after permeating through the separation membrane 12.

As described above, the mixed gas separation method includes the step of preparing the separation membrane 12 (step S11) and the step of supplying a mixed gas that contains a plurality of types of gases to the separation membrane 12 and causing a gas with higher permeability (i.e., high-permeability gas) in the mixed gas to permeate through the separation membrane 12 so as to separate the high-permeability gas from the mixed gas (step S12). In step S12, when $\Delta P$ is the difference between the feed pressure, which is the gas pressure on the primary side of the separation membrane 12, and the permeate pressure, which is the gas pressure on the secondary side of the separation membrane 12, and A is the Joule-Thomson coefficient, the difference $\Delta T$ between the feed temperature, which is the gas temperature on the primary side of the separation membrane 12, and the permeate temperature, which is the gas temperature on the secondary side of the separation membrane 12, is made less than 90% of $A \cdot \Delta P$ by setting the Nu number in the mixed gas to be greater than or equal to 2 and less than or equal to 10.

In this way, in the mixed gas separation method, the occurrence of a temperature drop in the permeated gas due to the Joule-Thomson effect during permeation of the separation membrane 12 can be reduced by setting the Nu number to be greater than or equal to 2 and less than or equal to 10, without causing an excessive rise of the feed temperature of the mixed gas. In other words, the temperature difference $\Delta T$ is reduced, which is the difference between the feed temperature and the permeate temperature described above. This suppresses degradation of permeated-gas diffusion properties in the pores of the separation membrane 12 while reducing the likelihood that the adsorption of the high-permeability gas to the separation membrane 12 will be inhibited. This also suppresses the closing of pores in the separation membrane 12 due to gas condensation. As a result, it is possible to suppress a decrease in permeance to the high-permeability gas.

Preferably, in step S12, the difference (i.e., differential pressure) $\Delta P$ between the feed pressure and the permeate pressure may be higher than or equal to 3.0 MPa. In the mixed gas separation method described above, it is possible to reduce the occurrence of a temperature drop in the permeated gas due to the Joule-Thomson effect and to suppress a decrease in permeance to the high-permeability gas. Therefore, this method is in particular suitable for use in separating a mixed gas under high differential pressure conditions under which a relatively large temperature drop is likely to be caused by the Joule-Thomson effect.

As described above, it is preferable that the gradient of the Nu plot relative to U is greater than or equal to 1 and less than or equal to 5, where Nu is the Nu number in the mixed gas and U is the linear velocity (m/sec) of the mixed gas. This allows the Nu number to be increased efficiently by a slight increase in linear velocity. Accordingly, even in the case of separating a large flow of mixed gas, it is possible to more favorably reduce the occurrence of a temperature drop in the permeated gas due to the Joule-Thomson effect by only slightly increasing the linear velocity of the mixed gas. As a result, it is possible to favorably suppress a decrease in permeance to the high-permeability gas and to allow a large flow of mixed gas to be separated speedily.

As described above, in step S12, the separation membrane 12 may preferably be heated from the permeate side. This further reduces the occurrence of a temperature drop in the permeated gas due to the Joule-Thomson effect.

In step S12, the space on the permeate side of the separation membrane 12 may preferably be insulated from the ambient atmosphere having a lower temperature than the space on the permeate side. In this case as well, it is possible to further reduce the occurrence of a temperature drop in the permeated gas due to the Joule-Thomson effect.

As described above, the difference ΔT between the feed temperature and the permeate temperature may preferably be less than 60% of A·ΔP. This further suppress a decrease in permeance to the high-permeability gas.

More preferably, the difference ΔT between the feed temperature and the permeate temperature may be less than 10% of A·ΔP. This further suppresses a decrease in permeance to the high-permeability gas as shown in Examples 1 and 2.

As described above, the separation membrane 12 may preferably have a tube-like shape and have an equivalent diameter of greater than or equal to 2 mm and less than or equal to 5 mm. This allows the mixed gas supplied to the inside or outside of the separation membrane 12 to easily form a turbulent flow and easily makes the Nu number in the mixed gas higher than or equal to 2.

More preferably, the separation membrane 12 may have a cylinder-like shape into which the mixed gas is supplied, and the equivalent diameter described above may correspond to the inner diameter of the separation membrane 12. This allows the mixed gas supplied to the inside of the separation membrane 12 to easily form a turbulent flow and easily makes the Nu number in the mixed gas greater than or equal to 2.

As described above, the separation membrane 12 may preferably be a zeolite membrane. By configuring the separation membrane 12 of zeolite crystals having uniform molecular sizes, selective permeation of a to be-permeated substance can be favorably achieved. As a result, it is possible to efficiently separate the to-be-permeated substance from the mixed gas.

More preferably, the separation membrane 12 may be composed of a zeolite in which an 8-membered ring is maximum. This favorably achieves selective permeation of a to-be-permeated substance having relatively small molecular sizes, such as $H_2$ or $CO_2$, and allows efficient separation of the to-be-permeated substance from a mixture of substances.

The gas separation method described above can reduce the occurrence of a temperature drop in the permeated gas due to the Joule-Thomson effect. Thus, this method is in particular suitable for the case in which the permeated gas that has permeated through the separation membrane 12 contains a condensable gas (i.e., the case in which pores in the separation membrane 12 may be closed due to condensation of the permeated gas).

The gas separation method described above is in particular suitable for cases in which the mixed gas contains one or more kinds of substances selected from among the group consisting of hydrogen, helium, nitrogen, oxygen, water, water vapor, carbon monoxide, carbon dioxide, nitrogen oxides, ammonia, sulfur oxides, hydrogen sulfides, sulfur fluorides, mercury, arsine, hydrogen cyanides, carbonyl sulfides, C1 to C8 hydrocarbons, organic acids, alcohol, mercaptans, ester, ether, ketone, and aldehyde.

The separation apparatus 2 described above includes the separation membrane 12 and the supplier 26 that supplies a mixed gas containing a plurality of types of gases to the separation membrane 12. The separation membrane 12 separates a gas with high permeability (i.e., high-permeability gas) in the mixed gas from the mixed gas by passing the high permeability gas. When ΔP is the difference between the feed pressure, which is the gas pressure on the primary side of the separation membrane 12, and the permeate pressure, which is the gas pressure on the secondary side of the separation membrane 12, and A is the Joule-Thomson coefficient, the difference ΔT between the feed temperature, which is the gas temperature on the primary side of the separation membrane 12, and the permeate temperature, which is the gas temperature on the secondary side of the separation membrane 12, is made less than 90% of A·ΔP by setting the Nu number in the mixed gas to be greater than or equal to 2 and less than or equal to 10. This suppresses a decrease in permeance to the high-permeability gas in the same manner as described above.

The mixed gas separation method and the separation apparatus 2 described above may be modified in various ways.

For example, in the case where the separation membrane 12 has a tube-like shape, the equivalent diameter of the separation membrane 12 may be less than 2 mm, or may be greater than 5 mm. Thus, in the case where the separation membrane 12 has an approximately cylinder-like shape into which the mixed gas is supplied, the inner diameter of the separation membrane 12 may be less than 2 mm, or may be greater than 5 mm. Note that the shape of the separation membrane 12 is not limited to a tube-like shape and may be any other shape (e.g., a flat plate-like shape).

In the separation apparatus 2, the structure, shape, and layout of the heat insulator 242 are not limited to the above-described example, and may be modified in various ways. Alternatively, the heat insulator 242 may be omitted from the separation apparatus 2.

In the separation apparatus 2, the structure, shape, and layout of the heating part 241 are not limited to the above-described example, and may be modified in various ways. For example, in the case where the separation membrane complex 1 includes the approximately cylinder-like support 11 and the separation membrane 12 that covers the outer surface of the support 11, the heating part 241 may, for example, be an approximately rod-like electrothermal heater inserted into the internal space of the support 11. Alternatively, the heating part 241 may be omitted from the separation apparatus 2.

In the mixed gas separation method described above, the value obtained by dividing the Nu number in the mixed gas by the linear velocity (m/sec) of the mixed gas may be less than 1, or may be greater than 5.

In the mixed gas separation method described above, the difference ΔP between the feed pressure and the permeate pressure may be less than 3 MPa.

The permeated gas permeating through the separation membrane 12 by the mixed gas separation method described above does not always contain a condensable gas.

The separation membrane complex 1 may further include, in addition to the support 11 and the separation membrane 12, a functional membrane or a protection membrane that are laminated on the separation membrane 12. Such a functional or protection membrane may be a zeolite membrane, an inorganic membrane such as a silica membrane or a carbon membrane, or an organic membrane such as a polyimide membrane or a silicone membrane.

The zeolite membrane 12 may be composed of a zeolite in which a more than 8-membered ring is maximum. The separation membrane 12 may also be a membrane other than a zeolite membrane (e.g., an inorganic or organic membrane described above).

In the separation apparatus 2 and the mixed gas separation method described above, substances other than those given in the above description may be separated from a mixed gas. The structure of the separation apparatus 2 is not limited to the above-described example, and may be modified in various ways.

The configurations of the above-described preferred embodiment and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The present invention is applicable for use in separating a mixed gas such as an exhaust gas emitted in integrated coal gasification combined cycle power generation (IGCC) or any other exhaust gas, or may be applicable for use in separating a variety of mixed gas other than an exhaust gas.

REFERENCE SIGNS LIST

2 separation apparatus
12 separation membrane
26 supplier
S11 to S12 step

The invention claimed is:

1. A mixed gas separation method comprising:

a) preparing a separation membrane; and b) supplying a mixed gas that contains a plurality of types of gases to said separation membrane and causing a gas with high permeability in said mixed gas to permeate through said separation membrane to separate said gas with high permeability from said mixed gas, wherein in said operation b), when ΔP is a difference between a feed pressure and a permeate pressure, the feed pressure being a gas pressure on a primary side of said separation membrane, the permeate pressure being a gas pressure on a secondary side of said separation membrane, and A is a Joule-Thomson coefficient, a difference ΔT between a feed temperature and a permeate temperature, the feed temperature being a gas temperature on the primary side of said separation membrane, the permeate temperature being a gas temperature on the secondary side of said separation membrane, is made less than 90% of A·ΔP by setting a Nu number in said mixed gas to be greater than or equal to 2 and less than or equal to 10.

2. The mixed gas separation method according to claim 1, wherein in said operation b), the difference ΔP between said feed pressure and said permeate pressure is greater than or equal to 3.0 MPa.

3. The mixed gas separation method according to claim 1, wherein a gradient of a Nu plot relative to U is greater than or equal to 1 and less than or equal to 5, where Nu is the Nu number in said mixed gas and U is a linear velocity (m/sec) of said mixed gas.

4. The mixed gas separation method according to claim 1, wherein in said operation b), said separation membrane is heated from a permeate side.

5. The mixed gas separation method according to claim 1, wherein in said operation b), a space on a permeate side of said separation membrane is insulated from an ambient atmosphere having a lower temperature than said space on said permeate side.

6. The mixed gas separation method according to claim 1, wherein the difference ΔT between said feed temperature and said permeate temperature is less than 60% of A·ΔP.

7. The mixed gas separation method according to claim 1, wherein said separation membrane has a tube-like shape, and said separation membrane has an equivalent diameter of greater than or equal to 2 mm and less than or equal to 5 mm.

8. The mixed gas separation method according to claim 7, wherein said separation membrane has a cylinder-like shape into which said mixed gas is supplied, and said equivalent diameter is an inner diameter of said separation membrane.

9. The mixed gas separation method according to claim 1, wherein said separation membrane is a zeolite membrane.

10. The mixed gas separation method according to claim 9, wherein said zeolite membrane is composed of a zeolite in which an 8-membered ring is maximum.

11. The mixed gas separation method according to claim 1, wherein a permeated gas that permeates through said separation membrane includes a condensable gas.

12. The mixed gas separation method according to claim 1, wherein said mixed gas includes one or more kinds of substances selected from among a group consisting of hydrogen, helium, nitrogen, oxygen, water, water vapor, carbon monoxide, carbon dioxide, nitrogen oxides, ammonia, sulfur oxides, hydrogen sulfides, sulfur fluorides, mercury, arsine, hydrogen cyanides, carbonyl sulfides, C1 to C8 hydrocarbons, organic acids, alcohol, mercaptans, ester, ether, ketone, and aldehyde.

* * * * *